United States Patent Office 3,437,639
Patented Apr. 8, 1969

3,437,639
PROCESS FOR PURIFYING POLYCARBONATES
Joseph L. Beach and Winston J. Jackson, Jr., Kingsport, Tenn., assignors to Eastman Kodak Company, Rochester, N.Y., a corporation of New Jersey
No Drawing. Filed Sept. 10, 1965, Ser. No. 486,565
Int. Cl. C08g 17/13
U.S. Cl. 260—47　　　　　　　　　　　　　　　10 Claims

ABSTRACT OF THE DISCLOSURE

Polycarbonates having improved stability are produced by (1) preparing the polymer in a solution containing a tertiary amine and an inert solvent in which the polymer is soluble but in which a tertiary amine-hydrohalide is essentially insoluble, (2) contacting the polymer solution with a hydrogen halide gas, (3) separating the tertiary amine-hydrohalide formed, and (4) recovering the polymer from the solution.

---

This invention relates to polycarbonates and, more particularly, concerns an improved process for preparing and purifying carbonate polymers in order to render them less subject to degradation upon standing or heating. Specifically, the invention is directed to a novel, improved process for the preparation and purification of polycarbonates whereby essentially all harmful salts are removed from the polymer.

It is known to prepare polycarbonates by the addition of phosgene and/or a bischloroformate of an aromatic dihydroxy compound to a solution comprising a bisphenol and a tertiary amine and/or an inert solvent. For example, a conventional method of preparing polycarbonates comprises the use of a tertiary amine, alone, as solvent, hyrogen halide acceptor and catalyst. Phosgene is bubbled into a solution of an aromatic dihydroxy compound, such as a bisphenol, in the amine and the following generalized reaction occurs:

$n\text{HO C}_6\text{H}_4\text{—C(CH}_3\text{)}_2\text{—C}_6\text{H}_4\text{OH} + n\text{COCl}_2 \longrightarrow$

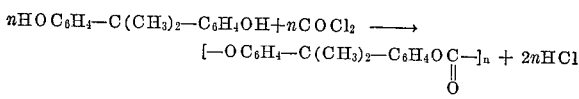

$+ 2n\text{HCl}$

During the polymerization reaction, the release of chlorine from the intermediate chloroformate initiates a side reaction by which the hydrochloride of the tertiary amine is formed which, if not removed completely from the polymer, will, eventually, attack and decompose the polymer. In the past, the removal of the amine-hydrochloride salt has been conventionally attempted by washing the polycarbonate with water. This method is, however, troublesome and time consuming, because of the volume of water and the number of washings necessary and does not sufficiently eliminate the amine-hydrochloride from the polymer without a considerable amount of washing.

Recently, it has been found that the use of chlorobenzene, in addition to the tertiary amine, as the polymer solvent produces better results than the water washing used in the past, since the amine-hydrochloride is relatively insoluble in chlorobenzene whereas the polymer is relatively soluble. The method is disadvantageous, however, in that after the separation of the amine-hydrochloride from the polymer solution, there still remains residual salt in the polymer solution due to the partial solubility of the amine-hydrochloride in chlorobenzene. Therefore, in order to free the polycarbonate of residual amine-hydrochloride, the chlorobenzene solution of polymer must be distilled. Upon distillation the amine-hydrochloride passes out of solution with the polymer solvent. In order, however, for a sufficient amount of amine-hydrochloride to be eliminated from the reaction mixture, at least one-half of the volume of the chlorobenzene must be evaporated. This distillation step, however, is time consuming, requires rather large volumes of solvent and necessitates the use of relatively complex distillation equipment and solvent recovery and recirculation apparatus. Further, even after such distillation step, all of the amine-hydrochloride is not completely removed when the polymer is separated from the chlorobenzene which has not been distilled from the solution. Moreover, prior methods of purification did not completely remove the tertiary amine from the polymer. The presence of the tertiary amine in the final polymer will lead to eventual reaction with any residual halogen remaining in the polymer and decomposition of the polymer will result.

Obviously, a need exists for a simple, effective and economical method for the removal of the amine-hydrochloride salt formed during the preparation of the polycarbonate.

Accordingly, it is an object of this invention to provide an improved process for the preparation and purification of polycarbonates.

A further object of the invention is to provide an improved process for purifying polycarbonates prepared in a non-aqueous solvent system containing a tertiary amine.

Another object of the invention is to provide a process for the preparation, purification and recovery of polycarbonates from a non-aqueous solvent system whereby the polycarbonate is recovered directly from the reaction medium and conventional post-polymerization washing steps are eliminated.

The above objects, and other objects which will be recognized by those skilled in the art, are attained by the method of this which, briefly, is directed to the method of preparing carbonate polymers which comprises (1) the addition of (A) a carbonyl halide to a solution comprising an aromatic dihydroxy compound and a tertiary amine, (B) a bishaloformate of an aromatic dihydroxy compound to a solution comprising an aromatic dihydroxy compound and a tertiary amine or (C) a mixture of a carbonyl halide and a bishaloformate of an aromatic dihydroxy compound to a solution comprising the same or different aromatic dihydroxy compound and a tertiary amine, each of the reactant solutions additionally containing an inert solvent for the polymer but in which the amine-hydrohalide is insoluble, (2) contacting the reaction mixture with a hydrogen halide gas in order to convert excess tertiary amine to the hydrohalide, (3) separation of the amine-hydrohalide from the reaction mixture and (4) precipitation of the polymer from solution if desired.

By practicing the invention in accordance with the improved process described above the water washing step is avoided. Further, the expensive and troublesome distillation technique heretofore employed, when chlorobenzene was used with the tertiary amine but without the addition of hydrogen halide or similar material to combine with the excess tertiary amine in the reaction mixture, is avoided. Further, as will be discussed hereinafter, it has been found that chlorobenzene may be used in the process of this invention to attain a higher degree of purification than has been accomplished in the past and that, surprisingly, by the use of the preferred solvents, hereinafter disclosed, results are obtained which show improvement even over the use of chlorobenzene.

In general, the process of the invention comprises the addition of a carbonyl halide, such as phosgene or the bishaloformate of an aromatic dihydroxy compound or mixtures thereof, to a stirred solution comprising a dihydroxy compound, which may be the same or different than the dihydroxy compound from which the bishaloformate has been prepared, a tertiary amine and an inert solvent for the polycarbonate but in which solvent the amine-hydrochloride salt is insoluble. A variety of copolycarbonates may be prepared by the addition of various hydroxy compounds to the reaction mixture. As the reaction between the phosgene or bishaloformate with the dihydroxy compound proceeds, halogen is relesaed and combines with the tertiary amine present in the reaction mixture to form the amine-hydrochloride. As polymerization continues, the polymer builds up in molecular weight and consequently the viscosity of the reaction mixture increases. Upon cessation of polymerization, the reaction mixture may be diluted with additional solvent and dry hydrogen halide is then passed into the reaction mixture to convert any excess tertiary amine to the hydrochloride. In this manner, the excess amine is converted to its salt which may then be separated. Thus, no residual amine will be present in the final polymer to react with residual halogen. Accordingly, decomposition of the polymer by such after-formed aminehydrochloride is eliminated. Upon complete conversion of excess tertiary amine to the hydrochloride, the amine-hydrochloride is separated from the mixture by allowing the salt to settle from the polymer solution and solidify and subsequently decanting the polymer solution. In lieu of decantation, the reaction mixture may be heated until the hydrochloride melts and the molten salt may then be withdrawn. A further method for separation of the polymer from the reaction mixture containing the insoluble amine-hydrochloride is by filtration of the polymer solution from the amine-hydrochloride.

The polymer is precipitated by addition, to the reaction mixture, of a polymer non-solvent, for example lower aliphatic acid esters such as ethyl acetate, lower aliphatic alcohols such as methanol, ethanol, isopropanol and the like, ketones such as acetone and mixture of acetone/alcohol and similar materials. If the polymer non-solvent used is acetone or an acetone/alcohol mixture, any last traces of amine-hydrochloride will be removed from the polymer since the amine-hydrochloride is soluble in acetone. If the non-solvent added to precipitate the polymer is not acetone or an acetone-containing mixture, it has been found that the last traces of amine-hydrochloride may advantageously be removed by addition, to the polymer solution, of an alkali-metal carbonate. Such carbonate will react with any remaining traces of amine-hydrochloride or excess hydrogen halide and the mixture is subsequently filtered in order to separate the inorganic salts which have been formed, such as the carbonate, bicarbonate and chloride.

In addition to the above-described steps, the polycarbonate is advantageously treated with a lower aliphatic alcohol or a phenol immediately after polymerization. Addition of the alcohol converts the terminal haloformate groups of the polycarbonate to alkyl- or arylcarbonate groups, depending upon the alcohol used in accordance with the reaction

wherein X is the terminal hydrocarbon portion of a bisphenol or diol polymer chain and R is phenyl or an alkyl radical of 1 to 4 carbon atoms. By this procedure, the polycarbonate is made more stable to aging, heat and hydrolysis. The alcohol may be added at the end of the polymerization reaction and before filtration or the alcohol may be added after filtration by merely precipitating the polymer in an alcohol-containing medium, such as acetone/alcohol.

The polycarbonates which are prepared according to the invention are those which are derived preferably from aromatic dihydroxy compounds which are sufficiently soluble in the reaction mixture to yield a soluble polycarbonate. For example, the aromatic dihydroxy compounds which are used include hydroquinone, resorcinol, naphthalenediol and those illustrated by the general formula

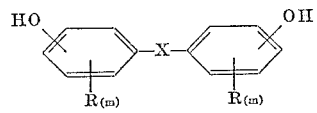

wherein R is hydrogen, halogen, nitro, alkyl or alkoxy, X is substituted or nonsubstituted alkyl or cycloalkyl, alkaryl, aralkyl, sulfonyl or radicals having the formulae

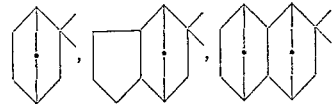

or

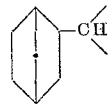

and $m$ is 1, 2 or 3.

Among the aromatic dihydroxy compounds which may be included in the polycarbonate are 4,4'-isopropylidene diphenol, 4,4' - (phenylmethylene)diphenol, 4,4' - cyclohexylidene diphenol, 4,4'-(cyclohexylmethylene)diphenol, 4,4'-(2-norbornylidene)diphenol, 4,4'-(2-norbornylidene) di-o-cresol, 4,4' - (2-norbornylidene)bis[2,6-dichlorophenol], 4,4' - (2-norbornylidene)bis[2-chlorophenol], 4,4'-(2-norbornylidene)bis[2,6-dibromophenol], 4,4'-(isopropylidene)bis[2,6-dichlorophenol], 4,4'-(2,4,6-trichloro-α-methylbenzylidene)diphenol, 4,4'-(hexahydro-4,7 - methanoindan - 5 - ylidene)di-o-cresol, 4,4'-(hexahydro - 4,7-methanoindan-5-ylidene)diphenol, 4,4'-(hexahydro - 4,7-methanoindan - 5 - ylidene)bis[2,6-dichlorophenol], 4,4'-(decahydro - 1,4:5,8 - dimethanonaphth-2-ylidene)diphenol, 4,4'-(decahydro-1,4:5,8-dimethanonaphth-2-ylidene) di-o-cresol, 4,4' - (decahydro-1,4:5,8-dimethanonaphth-2-yl-methylene)diphenol, 4,4' - (2-norbornylmethylene)diphenol, 4,4'-(methylene)bis[2,6-dichlorophenol], 4,4'-(3-methyl - 2-norbornylmethylene)-diphenol, 4,4'-sulfonyldiphenol, 2,4'-dihydroxydiphenyl-methane, bis-(2-hydroxyphenyl)-methane, bis-(4-hydroxy-5-nitrophenyl)-methane, bis-(4-hydroxy-2,6-dimethyl-3-methoxyphenyl) - methane, 1,1 - bis-(4-hydroxyphenyl)-ethane, 1,1-bis-(4-hydroxyphenyl)-ethane, 1,1-bis-(4 - hydroxy - 2 - chlorophenyl)-ethane, 1,1-bis-(2,5-dimethyl-4-hydroxyphenyl)-ethane, 1,3-bis-(3-methyl-4-hydroxyphenyl)-propane, 2,2 - bis-(3-phenyl-4-hydroxyphenyl)-propane, 2,2-bis-(3-isopropyl-4-hydroxyphenol)-propane, 2,2-bis-(4-hydroxyphenyl)-pentane, 3,3-bis-(4-hydroxyphenyl)-pentane, 2,2 - bis(4-hydroxyphenyl)-heptane, bis - (4 - hydroxyphenyl)-phenyl methane, bis-(4-hydroxyphenyl)-cyclohexyl methane, 1,2-bis-(4-hydroxyphenyl)-1,2-bis-(phenyl)ethane, 2,2-bis-(4-hydroxyphenyl) - 1,3-bis(phenyl)propane, 2,2-bis-(4-hydroxyphenyl)-1-phenyl propane and the like. Copolymers can be prepared by using two or more aromatic dihydroxy compounds illustrated by the above bisphenols. Additionally, copolymers can be prepared by replacing 10 to 90 percent of the phosgene with a diol bischloroformate or by replacing 10 to 90 mole percent of the bisphenol with an aliphatic, cycloaliphatic or alicyclic diol or bischloroformate thereof. The diols, which may contain from 2 to 20 carbon atoms, include ethylene glycol, 1,2-propylene glycol, 2,2-dimethyl-1,3-propanediol, 1,10-decanediol, 1,4-cyclohexanediol, 1,4-cyclohexanedimethanol, 2,5-norbornanediol and the like.

If it is desired to impart elastomeric properties to the final polymer, the diol can be a hydroxy-terminated, short chain polyether, polyformal, polyester or polyurethane. The average molecular weights of the polymer glycols may be about 500–5000, but molecular weights of 1500–3500 are preferred. The polymer glycols may be composed of mixtures of low and high molecular weight materials. It is preferred, however, that the glycol be a mix-